United States Patent
Koshy et al.

(10) Patent No.: US 10,136,395 B1
(45) Date of Patent: Nov. 20, 2018

(54) SYSTEM AND METHOD FOR CO-LOCATED SAR CONTROL IN AN INFORMATION HANDLING SYSTEM

(71) Applicant: Dell Products, LP, Round Rock, TX (US)

(72) Inventors: Kamal J. Koshy, Austin, TX (US);
Benny J. Bologna, Austin, TX (US);
Don A. Bobo, Cedar Park, TX (US);
Youngsoo Cho, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/650,958

(22) Filed: Jul. 16, 2017

(51) Int. Cl.
*H04W 52/22* (2009.01)
*H04W 52/24* (2009.01)
*H04W 52/34* (2009.01)
*H04W 52/16* (2009.01)

(52) U.S. Cl.
CPC ......... *H04W 52/223* (2013.01); *H04W 52/16* (2013.01); *H04W 52/226* (2013.01); *H04W 52/245* (2013.01); *H04W 52/346* (2013.01)

(58) Field of Classification Search
CPC ... H04W 52/18; H04W 52/26; H04W 52/245; H04W 52/267; H04W 52/281; H04W 52/30; H04W 52/367
See application file for complete search history.

(56) References Cited

U.S. PATENT DOCUMENTS

| | | | |
|---|---|---|---|
| 8,659,488 B2 | 2/2014 | Tsai | |
| 8,811,918 B2 | 8/2014 | Rath | |
| 8,897,181 B2 | 11/2014 | Wang | |
| 2011/0034135 A1 | 2/2011 | Ali | |
| 2012/0147801 A1* | 6/2012 | Ho | H04W 52/365 370/311 |

(Continued)

*Primary Examiner* — Duc M Nguyen
(74) *Attorney, Agent, or Firm* — Prol Intellectual Property Law, PLLC; H. Kenneth Prol

(57) ABSTRACT

A method and information handling system including a wireless interface adapter for communicating on a plurality antenna systems for connection to a plurality of concurrently operating wireless links and a processor executing code instructions for a co-located antenna dynamic power control system for detecting a first active wireless link operating via a first antenna system and a second active wireless link operating via a second, co-located antenna system, wherein the total transmission power between the first antenna system and the second antenna system is limited to a regulatory safety maximum. The processor determining relative transmission activity levels for the information handling system relative to the first active wireless link and the second active wireless link, including a first wireless link data rate transmission level for the first antenna system and a second wireless link data rate transmission level for the second antenna system and the co-located antenna dynamic power control system instructing the wireless interface adapter controller to increase transmission power to the first antenna and decrease transmission power to the second antenna relative to the regulatory safety maximum power level when the first wireless link data rate transmission level is greater than the second wireless link data rate transmission level.

20 Claims, 7 Drawing Sheets

Proposed Co-Located SAR
(Dynamic Power Control under Co SAR limit)

(56) References Cited

U.S. PATENT DOCUMENTS

| | | | |
|---|---|---|---|
| 2012/0270519 A1* | 10/2012 | Ngai | H04W 52/226 |
| | | | 455/404.1 |
| 2012/0270592 A1* | 10/2012 | Ngai | H04W 52/226 |
| | | | 455/522 |
| 2014/0155119 A1* | 6/2014 | Bishop | H04W 52/367 |
| | | | 455/552.1 |
| 2014/0248892 A1* | 9/2014 | Wilson | H04W 52/146 |
| | | | 455/452.1 |
| 2015/0031408 A1* | 1/2015 | Kalla | H04W 52/38 |
| | | | 455/522 |
| 2015/0333788 A1 | 11/2015 | Ding | |
| 2016/0174168 A1 | 6/2016 | Lu | |
| 2017/0195969 A1* | 7/2017 | Miao | H04W 52/0261 |

* cited by examiner

SYSTEM AND METHOD FOR CO-LOCATED SAR CONTROL IN AN INFORMATION HANDLING SYSTEM

FIELD OF THE DISCLOSURE

The present disclosure generally relates to a method and apparatus for control of wireless transmit power levels of plural antenna systems in compliance with regulatory specific absorption rate (SAR) requirements for information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Several available radiofrequency communication platforms in information handling systems may be operating simultaneously for data and other communications with other users via communication and data networks. As a result, cumulative levels of transmission power may be increased during simultaneous operation requiring reduction of power levels to maintain SAR regulatory limits.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
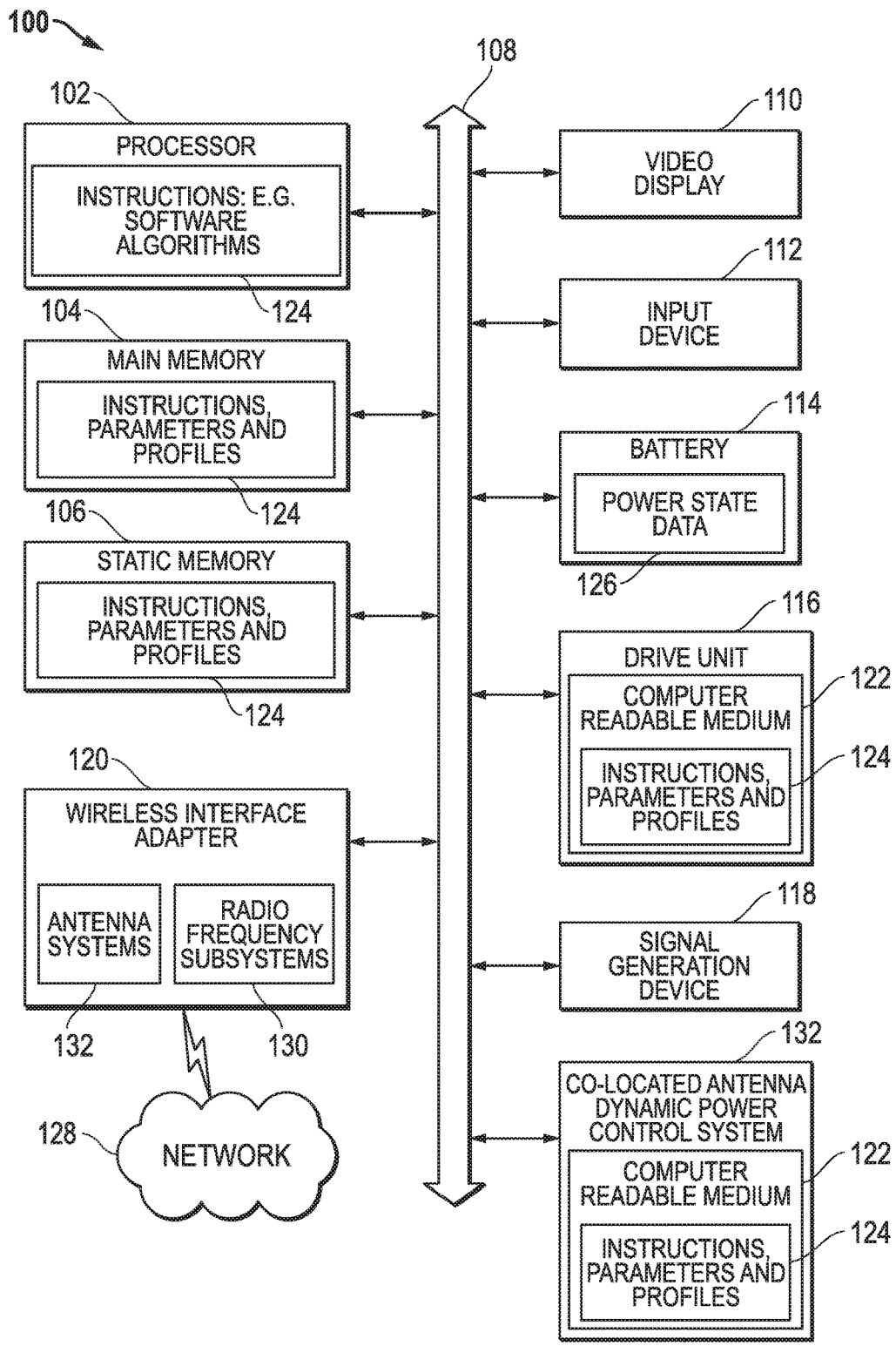
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In another aspect, several antenna systems may be available for each RAT to enable aggregated data communications such as via plural multiple in, multiple out (MIMO) streams to enhance bandwidth or reliability. Antenna systems may be operated via one or more wireless interface adapters that may include controllers, memory and other subsystems some of which may operate as a radio frequency (RF) front end for one or more antenna system to transmit wirelessly. Portions of an information handling system may themselves be considered information handling systems.

Currently, SAR power control mechanisms provide for all wireless antenna systems co-located on an information handling system to be simultaneously operating at a maximum power level up to a cumulative transmission power level amount. This does not account for variations of activity over the plurality of antenna systems on an information handling system. One or more antennas may not be active. One or more antennas may be operating in a primarily reception mode. One or more antennas may have various levels of mixed transmission and reception. One or more antenna systems may operate with high levels of upload transmissions. Moreover, types of data being transmitted by the antenna systems may vary as to priority levels which may make transmission at higher power levels important for information handing system operation. Due to the variation of transmission levels or data priority levels during operation, dynamic control over the transmission power levels for several co-located antenna systems may provide for improved operation of the information handling system and improved user experience. A co-located antenna dynamic power control system is described in embodiments of the present disclosure to provide dynamic power control over a plurality of co-located antennas that may transmit during operation while ensuring compliance with SAR restrictions on overall transmission levels.

FIG. 1 shows an information handling system 100 capable of administering each of the specific embodiments of the present disclosure. The information handling system 100 can represent the mobile information handling systems 210, 220, and 230 or servers or systems located anywhere within network 200 of FIG. 2, including the remote data centers operating virtual machine applications. Information handling system 100 may represent a mobile information handling system associated with a user or recipient of intended wireless communication. A mobile information handling system may execute instructions via a processor for a co-located antenna dynamic power control system used during concurrent wireless link utilization according to embodiments disclosed herein. The application programs communicating or otherwise operating via concurrently wireless links may operate in some example embodiments as software, in whole or in part, on a mobile information handling system while other portions of the software applications may operate on remote server systems. The co-located antenna dynamic power control system of the presently disclosed embodiments may operate as firmware, software, or hardwired circuitry or any combination on controllers or processors within the information handling system 100 or some of its components such as a wireless interface adapter or wireless interface device 120.

Information handling system 100 may also represent a networked server or other system and administer aspects of the antenna optimization system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or other display device. Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless interface adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may be software applications which utilize one or more wireless links for wireless communications via the wireless interface adapter, also referred to as a wireless interface device 120, as well as other aspects or components. Similarly instructions 124 may be executed as the co-located antenna dynamic power control system 135 disclosed herein for monitoring wireless link activity states, monitoring data transmission levels or data priority, and adjusting wireless power among antenna systems. In some aspects, the co-located antenna dynamic power control system may operate in whole or in part as firmware on a controller within the wireless interface device 120. Instructions 124 may also include aspects of the antenna optimization system as part of a unified antenna front end 125 described in the present disclosure and operating as firmware or software to remedy or adjust one or more of a plurality of antenna systems 132 via selecting wireless link communication frequency band channels. However, multiple antenna systems operating on various communication frequency bands may cumulatively be limited in transmission of power levels as determined for specific absorption rate (SAR) limitations under Federal Communication Commission rules and accepted safety standards in the art. Due to the nearness of transmission (and to some degree reception), co-located antenna systems in an information handling system 100 have effects on each other. Due to nearness of co-located antenna systems in an information handling system by virtue of physical proximity of the antenna systems, the SAR limits for transmission power are treated for the total power transmitted from the co-located antenna systems among other radiating sources.

Further, the type of information handling system 100 impacts the SAR limits. For example, mobile devices such as mobile smart phones, tablets, laptops may have different SAR limits. Further, SAR limits may depend on the radio access technology being used as well as the configuration of the information handling system 100. For example, WLAN may have an acceptable SAR range of transmission between 0 dBm and 18 dBm whereas a WWAN transmission may operate between 0 dBm and 24 dBm. In some embodiments, a laptop computer may be treated as requiring limits to 1.6 watts per kilogram exposure for surfaces or areas likely to touch a person, such as along the bottom where the laptop may rest on a lap. However a laptop may also remain on a table top during periods of usage. A smart phone or tablet may be assumed to have all surfaces likely to interface with human tissue including the bottom and sides of the display screen where it may be grabbed or held. A 2-in-1 convertible laptop device may behave like a tablet in one configuration and a laptop in a different configuration in some embodiments. Nonetheless, the information handling systems 100 that transmit radiofrequency energy will be subject to safety limits when it is anticipated that the information handling systems 100 will have locations of the transmitting antennas or co-located antennas that may come in relative close physical proximity to human tissue of a user. It is understood that greater distance from a transmitting antenna yields substantially reduced exposure and absorption by human tissue.

In some aspects, instructions 124 of a co-located antenna dynamic power control system may execute algorithms to regulate operation of the one or more antenna systems 132 in terms of transmission power levels in the information handling system 100 to avoid exceeding overall transmission power levels from co-located antenna operation used with information handling system 100. In many current situations, SAR limits for co-located antenna systems 132 is calculated for worst-case operation where all antenna systems 132 are assumed to be in full operation. Accordingly, most current SAR mitigation systems reduce power preemptively to all antenna systems assuming full operation of all antennas 132. In one aspect, determination of whether an antenna system 132 has an active wireless connection or whether one or more antenna systems 132 are off, in a dormant state, or in stand-by mode may be determined. Increasing power to active wireless connections on active antenna systems 132 may be conducted by the co-located antenna dynamic power control system. In a further aspect of the present embodiments, more than static one-step adjustments to power levels of active versus inactive wireless antenna systems 132 may be conducted by the co-located antenna dynamic power control system.

As described in embodiments herein, the co-located antenna dynamic power control system may dynamically alter transmission power levels based on simultaneous transmit configuration modes of the information handling system, ongoing data transmission network connection levels, priority requirements of current operations, or some combination of the same. A co-located antenna usage mode may provide for a current or anticipated wireless link activity level for each active antenna system to achieve improved user wireless experiences. Various embodiments of co-located usage modes reflecting network connection level activity for combinations of active antennas and dynamic transmission power controls by the co-located antenna dynamic power control system are described herein.

Various software modules comprising software application instructions 124 or firmware instructions may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of mobile information handling system usage modes by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to co-located antenna dynamic power control system algorithms or power control policies described in embodiments herein may be stored here or transmitted to local memory located with the wireless interface adapter 132.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the co-located antenna dynamic power control system may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless interface adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless interface adapter 120 may also include antenna systems 132 which may be tunable antenna systems for use with the system and methods disclosed herein. Additional antenna transmission power control circuitry (not shown) for controlling power to one or more antenna systems 132 may also be included with the wireless interface adapter 120 to implement power control measures to limit SAR transmission levels as described in various embodiments of the present disclosure.

In some aspects of the present disclosure, one wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. Multiple bands may be used across a plurality of antenna systems 132 in other embodiments. In either case, cumulative transmission power my impact whether the information handling system 100 overall is reaching SAR limits of possible exposure. In some embodiments, the shared, wireless communication band or multiple bands may be transmitted through one or a plurality of antennas 132 and via one or a plurality of wireless interface adapters 120. Other communication frequency bands are contemplated for use with the embodiments of the present disclosure as well.

In other aspects, the information handling system 100 operating as a mobile information handling system may operate a plurality of wireless interface adapters 120 for concurrent radio operation in one or more wireless communication bands. The plurality of wireless interface adapters 120 may further share a wireless communication band or operate in nearby wireless communication bands in some disclosed embodiments. Further, harmonics and other effects may impact SAR exposure levels when a plurality of wireless links are operating concurrently as in some of the presently described embodiments. The proximity of co-located antenna systems 132 precipitates a need to assess overall transmission power anticipated for the information handling system and potentially make dynamic power control adjustments to the antenna systems 132 according to the co-located antenna dynamic power control system of the present disclosure.

In some example embodiments, a plurality of antenna systems 132 are controlled via a plurality of wireless interface adapters 120. The interface adapters 120 may include baseband controller or other logic to execute portions of the co-located antenna dynamic power control system and to receive power level communication links for anticipated power levels to be used with each antenna system 132 controlled by that interface adapter 120. Plural interface adapters 120 may be connected to each other, connected to the CPU 120 and operating system or both types of connection may exist via one or more communication links via bus 108 or other communication lines. In example embodiments, a universal asynchronous receiver/transmitter (UART) or an enhanced serial peripheral interface bus (eSPI) communication link may be made between the baseband controllers or other power control of a wireless interface adapter 120 for control of one or more wireless antenna systems 132 via portions of the co-located antenna dynamic power control system.

Assessment of the usage mode of the information handling system 100 by the co-located antenna dynamic power control system may provide for adjustment of transmission power levels dynamically to comply with the regulatory SAR requirements during operation of several usage scenarios. The co-located antenna dynamic power control system may further improve the wireless experience by providing for enhanced operation of active wireless links with less tolerance for interruption or greater expected bandwidth usage from among a plurality of active antenna systems 132 while remaining within the SAR limits.

The wireless interface adapter 120 may operate in accordance with any wireless data communication standards. To communicate, wireless standards including IEEE 802.11 WLAN standards, IEEE 802.15 WPAN standards, WWAN such as 3GPP or 3GPP2, or similar wireless standards may be used. Wireless interface adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available frequency bands may be used each with a plurality of channels. For example, WLAN such as WiFi may operate at a 5 GHz frequency band. WLAN may also operate at a 2.4 GHz band in other examples. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, some licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless interface adapter 120 or wireless interface device can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for wireless communication. The radio frequency subsystems 130 include wireless controllers to manage authentication, connectivity, communications, power levels for transmission, buffering, error correction, baseband processing, and other functions of the wireless interface adapter 120. Further, one or more wireless interface adapters 120 may be used to operate several portions of a co-located antenna systems 132 in an information handling system 100.

The radio frequency subsystems 130 of the wireless interface adapters 120 may also measure various metrics relating to wireless communication pursuant to operation of a plurality of concurrently operating antenna systems. For example, the wireless controller of a radio frequency subsystem 130 may manage detecting and measuring received signal strength levels, bit error rates, signal to noise ratios, latencies, jitter, and other metrics relating to signal quality and strength. The wireless interface adapters 120 may also measure various metrics relating to operation of the co-located antenna dynamic power control system as in the present disclosure. For example, antenna activity state, ongoing or anticipated data transmission levels, or assessment of the type of data transmitted may be detected and reported to a co-located antenna dynamic power control system.

In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless interface adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless interface adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
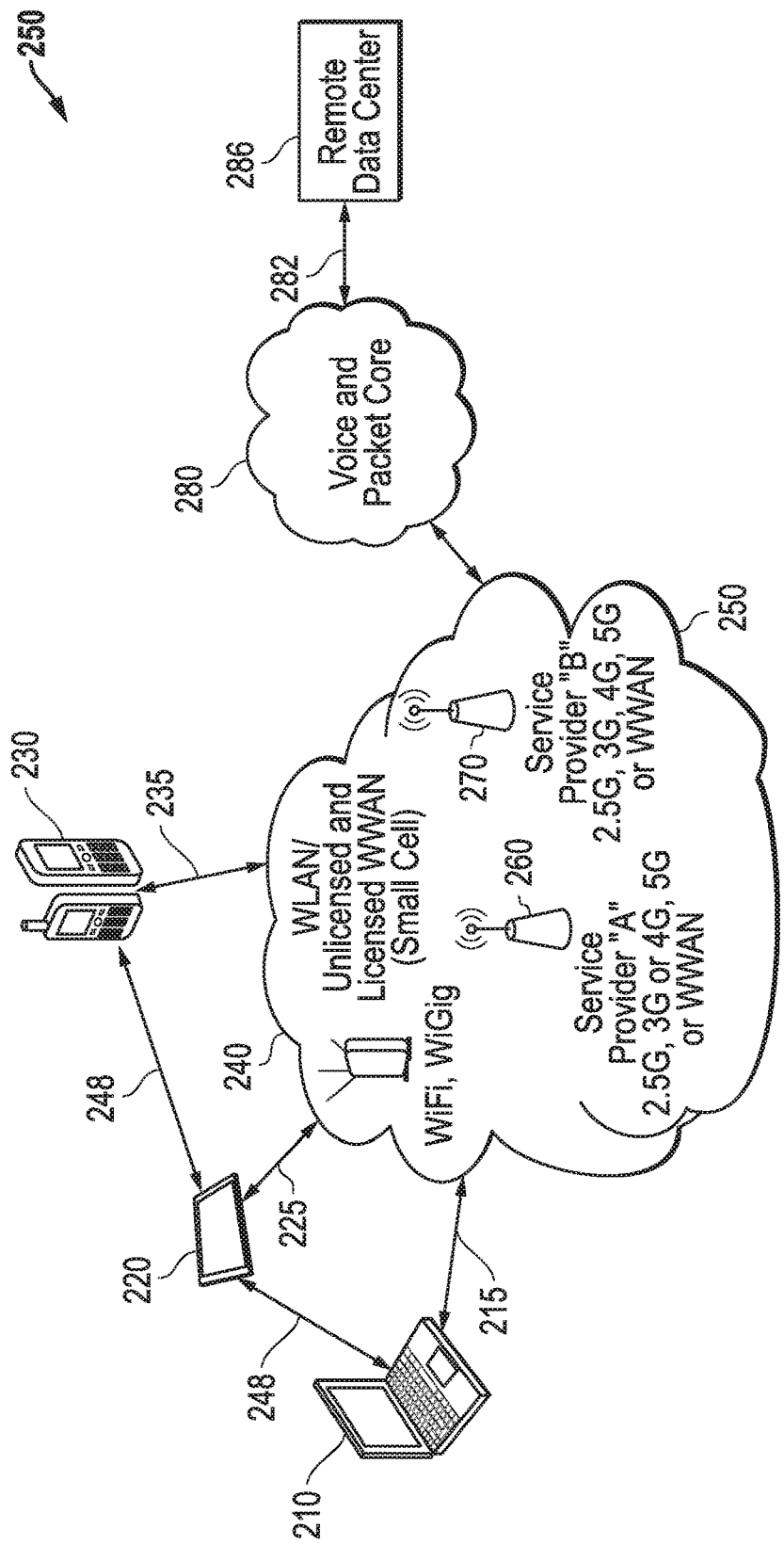
FIG. 2 is a block diagram of a network environment with several communication protocol options and mobile information handling systems according to an embodiment of the present disclosure.

FIG. 2 illustrates a network 200 that can include one or more information handling systems. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality wireless network interface systems capable of transmitting simultaneously. Example competing protocols may be wireless network access protocols such as Wi-Fi, WiGig, and WWAN in an unlicensed and licensed communication frequency bands. Access to a plurality of wireless networks 240 and 250 access points (APs) for Wi-Fi or WiGig as well as WWAN connectivity may be available in emerging 5G technology. This may create situations where a plurality of antenna systems are operating on a mobile information handling system 210, 220 or 230 via concurrent active wireless links on both WLAN and WWAN and which may operate within the same, adjacent, or otherwise co-located antenna systems. Such issues may be addressed or mitigated with remedies according to the co-located antenna dynamic power control system according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

In an example embodiment, the cloud or remote data center or networked server may run hosted applications for systems 210, 220, and 230. For example, remote data center, networked server, or some combination of both may operate some or all of a co-located antenna dynamic power control system in embodiments of the present disclosure including storing and providing antenna power control policy to models of information handling system 100 or updates of the same as disclosed in the present disclosure. The cloud or remote data center or networked server may run hosted applications for systems 210, 220, and 230 by establishing a virtual machine application executing software to manage applications hosted at the remote data center in an example embodiment. Mobile information handling systems 210, 220, and 230 are adapted to run one or more applications locally, and to have hosted applications run in association with the local applications at remote data center or networked servers. For example, mobile information handling systems 210, 220, and 230 may operate some or all of the co-located antenna dynamic power control system or software applications utilizing the wireless links, including a concurrent wireless links, in some embodiments. The virtual machine application may serve one or more applications to each of mobile information handling system 210, 220, and 230. Thus, as illustrated, systems 210, 220, and 230 may be running applications locally while requesting data objects related to those applications from the remote data center via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. The web browser application may request web data from a host application that represents a hosted website and associated applications running at a remote data center.

Although 215, 225, and 235 are shown connecting wireless interface adapters of mobile information handling systems 210, 220, and 230 to wireless networks 240 or 250, wireless communication may link through a wireless access point (Wi-Fi or WiGig), through WWAN small cell base stations such as in network 240 or though a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access point including other mobile information handling systems as illustrated in FIG. 2.

Figure 3:
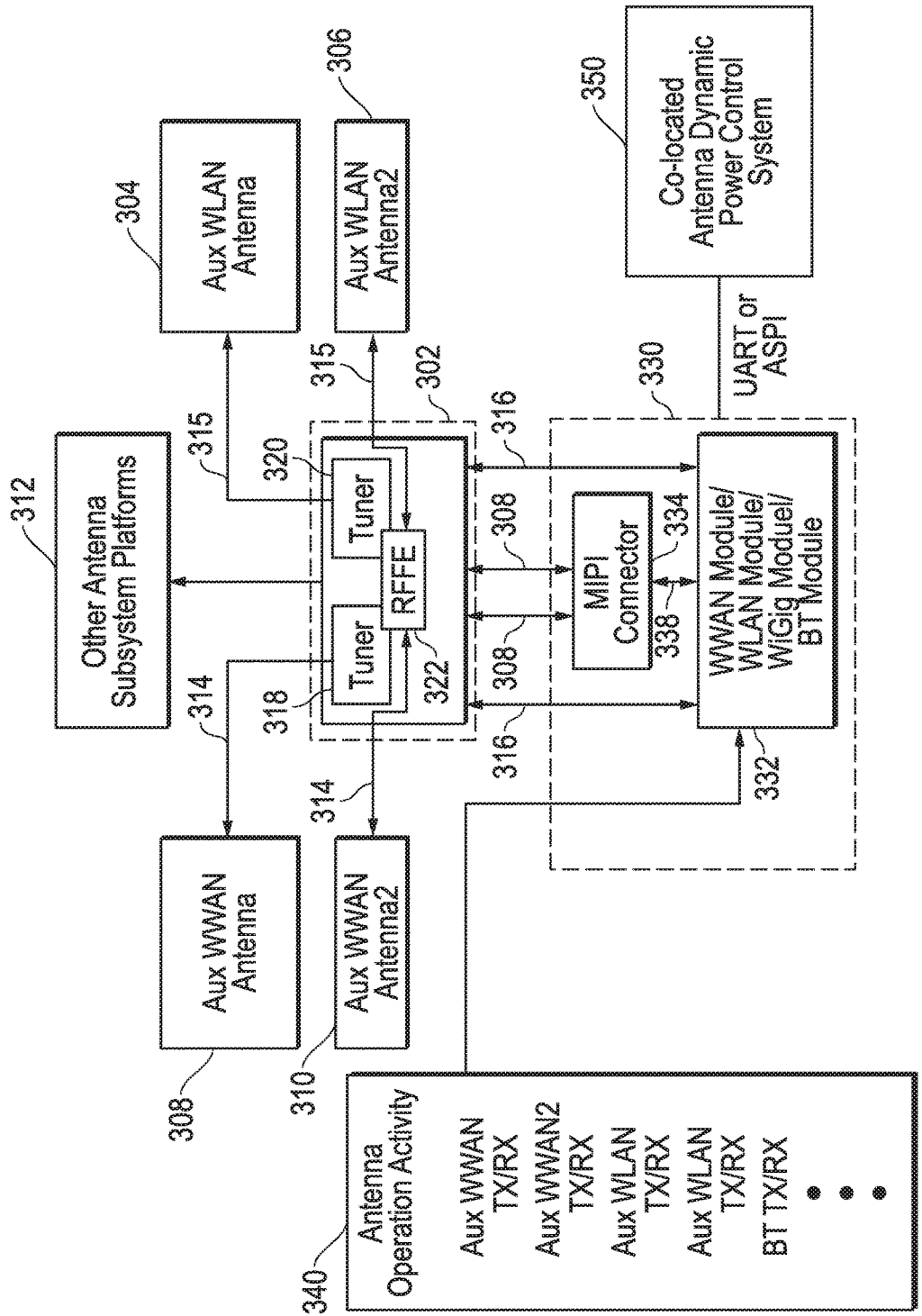
FIG. 3 is a block diagram illustrating a co-located antenna dynamic power control system and wireless interface according to an embodiment of the present disclosure.

FIG. 3 illustrates a co-located antenna dynamic power control system 350 operating via an RF front end 302 and a wireless interface adapter 330 for one or more antenna systems 304, 306, 308, 310 and 312 that may operate on an information handling system in an example embodiment. In an example aspect, the RF front end 302 may operate a plurality of tuners and power controller for the plurality of antenna systems 304, 306, 308, 310, and 312. In other embodiments, the RF front end 302 may be a unified front end which accommodates a plurality or all of the operational antenna systems 304, 306, 308, 310, and 312 of the information handling system. The RF front end 302 in other embodiments may include a plurality of RF front end systems for the types of antenna systems 304, 306, 308, 310, and 312 available at an information handling system. In embodiments, the RF front end 302, either unified or plural front end systems, may accommodate operation of the co-located antenna dynamic power control system 350 and may operate with a wireless interface adapter 330 for determination of active wireless systems 340. Determination of active wireless systems 340 by the co-located antenna dynamic power control system 350 will provide for determination of dynamic power control over antenna systems 304, 306, 308, 310, and 312 based on relative data transmission levels between active antenna systems according to embodiments of the present disclosure. Determination of active wireless links 340 and determination of relative data transmission levels act as trigger factors in determining relative power allotment for the active antenna systems amongst antenna systems 304, 306, 308, 310, and 312. Coordination of power levels for antenna systems 304, 306, 308, 310, and 312 may be via a wireless interface device 330 and a unified front end 302 or may be conducted by a processor or the wireless interface device 330 in connection with a plurality of RF front end systems for control of antenna systems 304, 306, 308, 310, and 312.

In yet another aspect, RF front end, such as the unified RF front end shown at 302, may also concurrently operate multiple antenna systems within the same RAT such as plural cellular connections or with MIMO or other aggregated connectivity through the plural antennas on the information handling system. Concurrent antenna operation may be across a variety of available RATs and may further accommodate aggregation of multiple parallel data streams across RATs in some embodiments as such technology becomes more available. In an example embodiment, a information handling system wireless interface adapter 330 may operate a plurality of WiFi antenna systems with MIMO to expand available bandwidth for wireless data transfer via WiFi. Similarly, in other embodiments, a plurality of LTE or other WWAN wireless links may be operated with MIMO to expand bandwidth for wireless data transfer via LTE. In some additional embodiments, plural data streams may be aggregated between WWAN and WLAN.

As described herein, co-located antenna dynamic power control system 350 may receive a plurality of inputs and access a dynamic power control adjustment policy stored for antenna element power control parameters to execute modifications to the power levels amongst the antenna systems 304, 306, 308, 310 and 312. The co-located antenna dynamic power control policy may be particular to a model type of an information handling system in an aspect. One or more of several antenna simultaneous transmit configuration modes are available to the RF front end 302 in some embodiments. The co-located antenna dynamic power control system 350 may implicate the detected antenna simultaneous transmit configuration modes to accommodate the dynamic power control adjustment policy based on received trigger inputs such as detected active wireless links, data transmission levels on the active wireless links, and determination of relative activity levels between transmission and reception for the plurality of antenna systems 304, 306, 308, 310 and 312 among other trigger inputs as described in various embodiments herein.

The RF front end 302 may include a RF front end controller 322 that may include access to a local memory for a unified device or for a plurality of RF front ends 302 (not shown). The RF front end controller 322 may also interface with one or more tuners 318 and 320. The RF front end module 302 may interface with a plurality of antenna systems 304, 306, 308, 310, and 312 directly or via a tuner system and may further control power levels supplied to each of the one or a plurality of antenna systems 304, 306, 308, 310, and 312 it controls. In FIG. 3, a plurality of WWAN antenna systems are shown such as for cellular connectivity to wireless links. It is understood that some portions of antenna systems 304, 306, 308, 310, and 312 in the presently shown example embodiment may be differing services available through WWAN including small cell licensed WWAN connections or subscriber cellular connectivity such as through LTE, WCDMA, or other WWAN protocols. Further, it is understood that other antenna systems 304, 306, 308, 310, and 312 are shown as a plurality of WLAN antennas such as WiFi antennas, the RF front end 302 may also be used to interface with a plurality of additional antennas, for example WLAN or WPAN antennas such as Bluetooth® systems. Also, a plurality of LTE and Wi-Fi antennas may be mounted and operational on the information handling system model in which a unified RF front end 302 or a plurality of RF front ends 302 are installed.

In some aspects, a plurality of RF front end systems or a unified RF front end 302 may interface and control a plurality of antennas across several RAT types including cellular, Wi-Fi, and Bluetooth to name a few as well as a wireless interface adapter system 330. A CPU, a wireless interface adapter 330, or RF front end 302 and controller 322 thereon may execute machine readable code instructions of co-located antenna dynamic power control system 350 for dynamic power control of the plurality of antennas associated with a wireless interface device 330 or connected in coordination of the same according to embodiments of the present disclosure. For example, RF front end 302 or wireless interface adapter 330 may interface with other wireless interface adapters or other RF front ends and their wireless antenna subsystem platforms. Coordination with those other antenna subsystem platforms may be to varying degrees but may be coordinated with the dynamic antenna power adjustments in response to determination of data transmission levels or priority levels for active, co-located antenna systems.

Antenna systems 304, 306, 308, 310 and 312 may be connected to RF front end 302 via connections 314 which may include antenna connection ports in some embodiments. Antenna systems 304, 306, 308, 310 and 312 may be a variety of antenna systems that are mounted within the information handling system or may utilize peripheral antenna systems connected to RF front end 302. In some example embodiments, antenna systems 304, 306, 308, 310 and 312 may utilize an antenna device installed on an information handling system. In other embodiments, antenna systems 304, 306, 308, 310 and 312 may also incorporate RF radiator surfaces such as portions of the information handling system chassis, motherboard, wiring/traces, or case components as aspects of the antenna systems 304, 306, 308, 310 and 312. Some of these RF radiation effects may not be intentional but may affect cumulative SAR exposure levels for various information handling systems. In yet other example embodiments, antenna systems 304, 306, 308, 310 and 312 may utilize auxiliary devices such as cords or cabling external to the information handling system which may additionally affect SAR exposure levels during co-located operation.

RF front end 302 may be connected to a plurality of system motherboard components of a wireless interface device for a mobile information handling system. For example, I2C lines such as 316 may be connected between an RF front end 302 and a WWAN module or other protocol module such as WLAN or Bluetooth modules for control via the protocol. In a further aspect, a Mobile Industry Processor Interface (MIPI) connector 334 may be connected via one or more MIPI lines 308 to RF front end 302 in an embodiment. The MIPI connector 334 may in turn be connected to a protocol module 332 via 338 and may be used to forward instructions, policy details, or other data or commands to the RF front end 302 according to embodiments of the present disclosure. It is understood that the I2C lines or MIPI lines may be used for various aspects of the embodiments disclosed herein including for transfer of data, activity detection, data transmission levels, policy, or commands from the protocol module 332, the co-located antenna dynamic power control system 350, or subsystems of the wireless interface device adapter to the RF front end 302.

Additional sensor based power controls may be implemented according to some embodiments along with those of the co-located antenna dynamic power control system 350 of the embodiments of the present disclosure. For example, power driving for transmission may be shifted as between concurrently operating antenna systems by the unified RF front end depending on a trigger input arising indicating a need to reduce or increase power to any antenna system. For example, if a user body part is detected proximate to one or more antenna systems, those systems may have transmission power reduced. Other power reduction activity may be implemented along with the dynamic power controls of the co-located antenna dynamic power control system 350 of the present embodiments.

Figure 4:
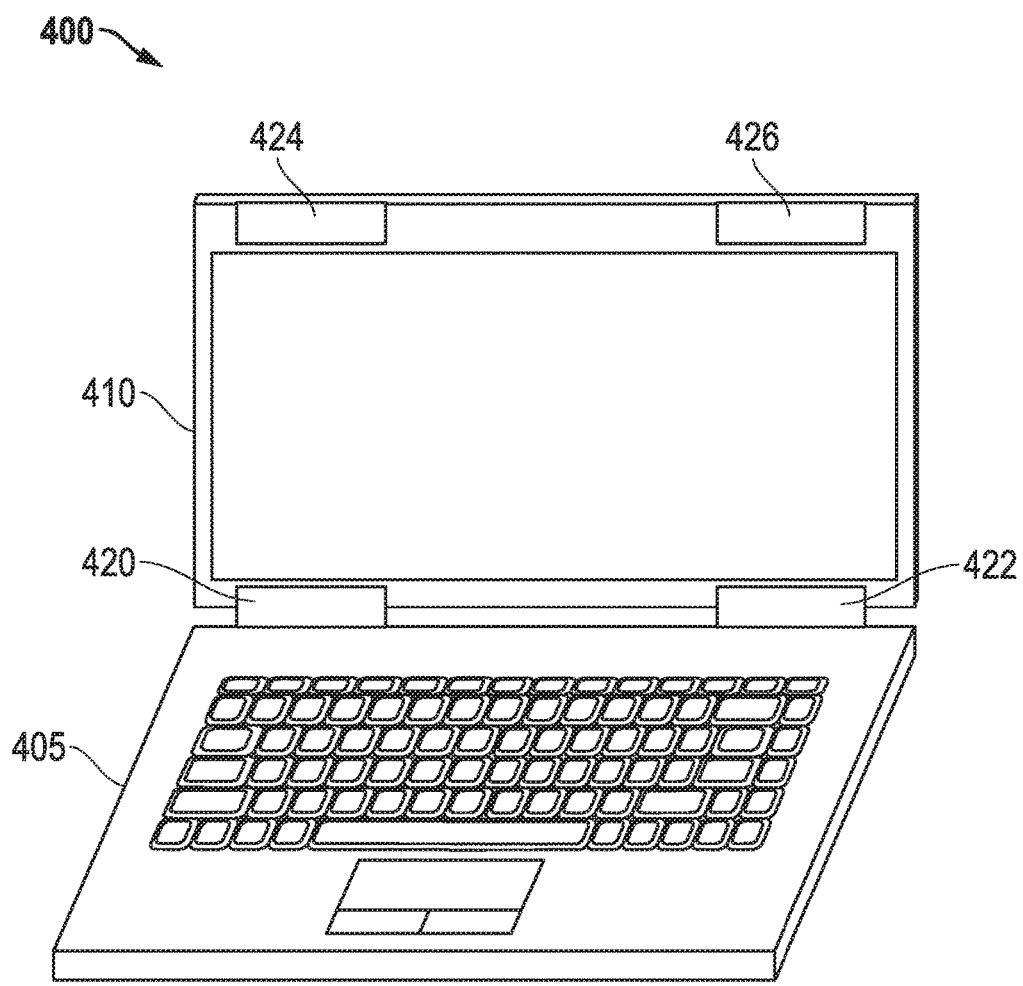
FIG. 4 is a graphic diagram illustrating a mobile information handling system with a plurality of co-located antenna systems according to an embodiment of the present disclosure.

FIG. 4 shows an information handling system 400 with multiple co-located antenna systems according to an embodiment of the present disclosure. In this example embodiment, information handling system 400 is a laptop, however many other information handling system types are contemplated for use with the co-located antenna dynamic power control system of the embodiments herein. For example, co-located antenna dynamic power control system may be used with a tablet information handling system, a mobile smart phone, a wearable information handling system, or any other information handling system. FIG. 4 shows a laptop system 400 for purposes of explanation. Information handling system 400 includes a display screen portion 410 and a keyboard base 405 and may operate in accordance with one or more embodiments above including some of those of FIG. 1. Information handling system 400 is shown with a plurality of antenna systems 420, 422, 424, and 426 mounted around various locations on the information handling system 400. In the example embodiment, antennas 400 and 422 are WLAN antenna systems such as those for 2.4 GHz and 5 GHz WiFi in an example embodiment. Antennas 424 and 426 are WWAN antennas in the example embodiment such as two (or more) LTE antenna systems operating in one or more bands. It is understood that additional antenna systems for WWAN, WLAN, or other protocols such as WiGig and Bluetooth may be implemented as well although not shown in FIG. 4. The antenna systems 420, 422, 424, and 426 are shown located at positions around display portion 410. This is one example arrangement of co-located antenna systems, however antenna systems 420, 422, 424, and 426 may be mounted in any location of the display portion 410 or the keyboard base 405. The antenna systems 420, 422, 424, and 426 may further utilize surfaces such as the back or edges of display portion 410 or portions of the keyboard base as radiating surfaces to work with those antenna systems.

Figure 5:
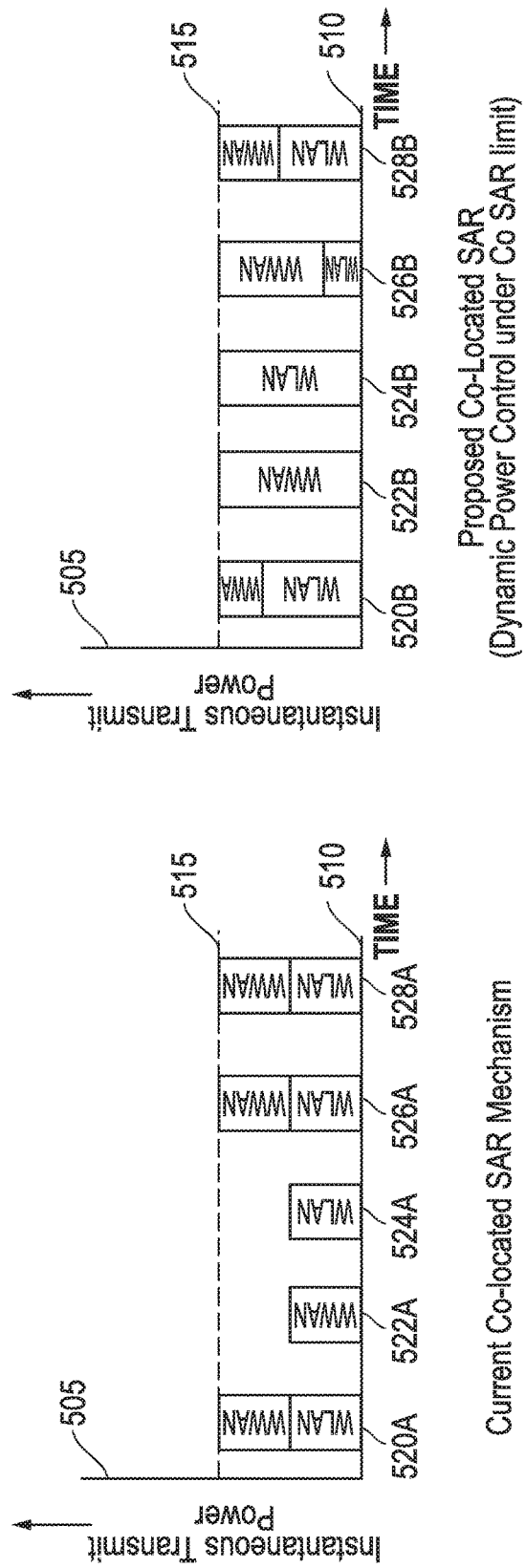
FIG. 5A is a graphic diagram illustrating control over transmission power with the control to maintain transmitter levels within SAR levels.
FIG. 5B is a graphic diagram illustrating dynamic control over transmission power with the control to maintain SAR levels according to an embodiment of the present disclosure.

FIG. 5A and FIG. 5B show a graphic illustration of the operation of the co-located antenna dynamic power control system to dynamically adjust power between WLAN and WWAN transmitting antenna systems based on the determinations of data transmission traffic flow levels relative to current co-located SAR control mechanisms according to embodiments herein. It is understood that FIG. 5A and FIG. 5B are for illustration purposes. It can be appreciated that three or more wireless transmission protocols may have power allocated among antenna system by the co-located antenna dynamic power control system of the embodiments herein. Further, multiple WLAN antenna systems, WWAN antenna systems, WiGig systems, WPAN systems or the like may also have power apportioned according to operation of the co-located antenna dynamic power control system.

FIG. 5A shows a graphical illustration of the operation of present co-located SAR mechanisms showing instantaneous transmit power levels along axis 505 over time along axis 510. Each bar graph shows an instantaneous transmit power level for both WWAN and WLAN combined. A maximum combined transmit power level 515 is shown across all points in time and is limited by the FCC or other SAR transmit power exposure regulations for information handling systems with a plurality of co-located antennas.

Depending on the type of information handling system, determination of maximum SAR exposure levels contemplates usage of those information handling systems within 20 cm of radiating sources such as the antenna systems or surfaces which radiate. In the present example, a SAR exposure limit may be limited to 1.6 W/kg for head or body exposure as set by the FCC (US) and ISED (Canada). In Europe, the SAR exposure limits are 2.0 W/kg under CE regulations. As an example embodiment, the maximum combined exposure power level 515 may be one of the above limits for simultaneously operating transmitters.

In current co-located SAR mechanisms it is assumed, during testing as well as for regular operation, that the antenna systems are fully operating as transmitting systems for purposes of SAR measurements. The total cumulative instantaneous power levels at 520A reach the maximum combined transmit power level 515, but if the WLAN is inactive at time 522A, then the remaining WWAN transmitter or transmitters operate as if the WLAN is still fully active in current SAR mechanisms. Similarly, if the WWAN is inactive as shown at time 524A, then the remaining WLAN transmitter or transmitters operate as if the WWAN is still fully active in current SAR mechanisms. At time 526A and 528A, both the WLAN and WWAN antenna systems are active again but power levels for each have remained consistent over each instantaneous time point. However, at time points where both WLAN and WWAN are active, it is noted that the distribution of data transmission levels between antennas may be substantially varied as the information handling system operates dynamically. Thus, current SAR mechanisms treat the WWAN and WLAN as if both operate at maximum level available under co-located operation maximum combined exposure power level 515. Current SAR mechanisms do not optimize the potential efficacy of concurrent RF transmissions.

By comparison, FIG. 5B shows one example embodiment where the co-located antenna dynamic power control system dynamically adjusts power between WLAN and WWAN antenna systems according to an embodiment of the present disclosure. Other control is contemplated as well by the co-located antenna dynamic power control system to dynamically adjust power between multiple WLAN antenna systems, multiple WWAN antenna systems, multiple WPAN system, or any combination of protocol types operating on co-located antennas as appropriate. For purposes of the present embodiment, one WLAN and one WWAN antenna or a plurality of WLAN and a plurality of WWAN antennas operating together, or some combination is illustrated.

FIG. 5B shows a graphical illustration of the operation of the co-located antenna dynamic power control system showing instantaneous transmit power levels along axis 505 over time along axis 510. Each bar graph entry again shows an instantaneous transmit power level for both WWAN and WLAN combined. A maximum combined transmit power level 515 is shown across all points in time and is limited by the FCC or other SAR transmit power exposure regulations for information handling systems with a plurality of co-located antennas as explained.

Although the total cumulative instantaneous power levels at 520B reach the maximum combined transmit power level 515 due to the operation of both WLAN and WWAN, the co-located antenna dynamic power control system has determined a ratio difference of data transmission levels as between the WLAN antenna or antennas and the WWAN antenna or antennas.

It is understood that the total cumulative instantaneous power levels, as shown at 520B, 522B, 524B, 526B and 528B are not strictly additive in most embodiments. The total cumulative instantaneous power levels are combined to increase when both or a plurality of transmitters are simultaneously operating, however the relationship of how the transmission power exposure levels add are dependent on location and orientation of the plural antenna systems with respect to one another across the wireless information handling system. The total cumulative instantaneous power levels depend in part on how close the source antenna systems are to one another for example. Antenna system systems further away experience higher levels of attenuation with respect to one another. Thus, the cumulative effect of both or the plurality of transmitters simultaneously operating is lessened and not purely additive. Further, directionality of the wireless transmission propagation has a similar effect on how the simultaneous transmission power levels combine to yield the total cumulative instantaneous power levels at parts of the information handling systems tested for SAR exposure. Finally, as antenna systems are actively transmitting or not will further change the dynamics of accumulation of the instantaneous power levels as spots on the information handling system.

During testing for SAR exposure levels, determination of "hot spots" may be made under various scenarios of simultaneous transmission. From that, it may be determined what the ultimate total cumulative instantaneous power levels are along surfaces and edges tested. These levels may then be associated with drive power levels of power sent to the antenna systems by the wireless modules and the front end controllers. A corresponding relationship may be made between the driving power levels to the antenna systems and the resulting total cumulative instantaneous power levels due to simultaneous transmissions and recorded for various simultaneous transmission scenarios. In this way, reduction levels may be determined for power cutback tables such as the example embodiments described herein. Thus, the co-located antenna dynamic power control system may provide for allocation of transmission power levels between a plurality of active antenna systems according to the various embodiments herein whether for WWAN and WLAN antennas simultaneously transmitting or additional antenna systems operating such as WPAN, WiGig, or a plurality of any of the above independently transmitting.

The determination of the levels of data transmission levels by the co-located antenna dynamic power control system yields a power cutback of the WWAN operation in one example embodiment. In a further embodiment, the co-located antenna dynamic power control system may provide a corresponding increase in power level of the WLAN operation, but not to exceed the maximum combined transmit power level 515. In this way, the transmitting antenna with the higher detected data transmission level may benefit from a higher transmission power level that is closer to a level it could operate at if no co-located antenna systems were present. The higher transmission power level provides for improved transmission quality and fewer errors in data transmission for that transmitting antenna; in this case the WLAN antenna or antennas at 520B. If the WLAN is inactive at time 522B, then the remaining WWAN transmitter or transmitters operate, but may increase power in an embodiment as if the WLAN were not present. WLAN may be considered inactive when the WLAN is turned off or in standby mode for example. The WWAN may operate at a maximum level as if no co-located antenna system were present at that point in time.

Similarly, if the WWAN is inactive at time 524B, then the remaining WLAN transmitter or transmitters operate, but may increase power in an embodiment as if the WWAN were not present. The WLAN may operate as if it were the only system present for that period of time. At time 526B and 528B, both the WLAN and WWAN antenna systems are active again. At 526B, the co-located antenna dynamic power control system yields a power cutback of WLAN. This cutback may be due to lower data transmission levels determined for the WLAN in an example embodiment, such as when the WLAN is operating at background levels or is entirely operating in receive mode. In another embodiment, the higher WWAN antenna system data transmission levels may be permitted to implement a corresponding increase in power levels within the limitations of 515.

At 528B, the co-located antenna dynamic power control system yields a power cutback of WWAN again. At this instantaneous time point a lesser cutback of WWAN transmission power may be warranted due to the determined relative data transmission levels of all active antenna types. For example, the relative data transmission levels between WLAN and WWAN antenna systems may be less than at 520B. In another aspect, the higher WLAN antenna system or systems may be permitted a corresponding increase in power levels within the limitations of 515.

As is shown, the co-located antenna dynamic power control system may dynamically administer power cutbacks according to some embodiment. In another embodiments, the co-located antenna dynamic power control system may also dynamically permit power level increases to within the limitations of 515. It is understood that the example embodiment of FIG. 5B may be applied to three or more independently transmitting antenna systems where each type of LTE or each type of WiFi or other antenna systems under other protocols may contribute to reaching a maximum combined transmit power level 515 and cutback adjustments may be made to one or more of the plurality of co-located active transmission systems. Remaining systems may be permitted transmission power level increases but within the maximum levels in other embodiments.

Figure 6:
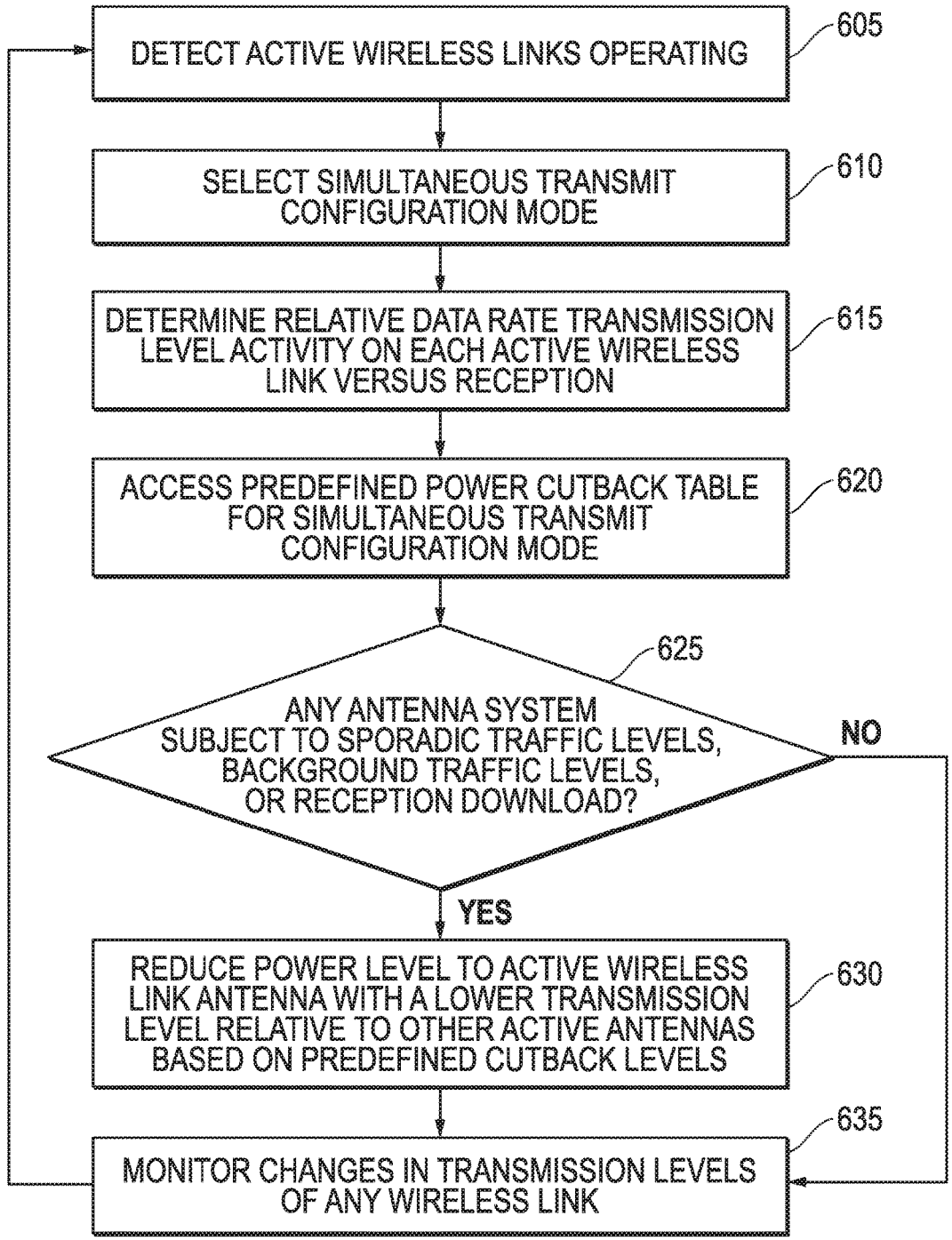
FIG. 6 is a flow diagram illustrating a method of dynamic control of a plurality of co-located and operating antenna systems to maintain regulatory SAR levels for an information handling system according to an embodiment of the present disclosure.

FIG. 6 illustrates a method for determining data transmission levels among co-located antenna systems for dynamic power level adjustment by a co-located antenna dynamic power control system according to an embodiment. In this example embodiment, one or more wireless links may be active in a user mobile information handling system as described above. Those links may simultaneously operate in the same or similar wireless protocols such as with MIMO operation, may be independently operate across a plurality a plurality of protocols, or some combination of the above. At 605, the co-located antenna dynamic power control system may detect which wireless links, and which corresponding antenna systems, are active. In other words, instead of assuming all antenna systems are fully active and operating as transmitters, a wireless interface device or a plurality of wireless interface devices will determine if a corresponding module for operating in a wireless protocol is activated and operating. In some cases, wireless protocols and their corresponding antenna systems in an information handling system may be turned off or in a dormant or sleep mode or may have no connectivity.

Based on the active versus inactive wireless links operating on the information handling system, the co-located antenna dynamic power control system will select a simultaneous transmit configuration mode at 610. The simultaneous transmit configuration mode is the selection of antenna systems co-located on an information handling system that are determined to be currently in operation. In other words they are on, not in dormant or sleep mode, or have potential connectivity. Either or any combination of the above criteria may be used to determine that a wireless link is in an active state. The co-located antenna dynamic power control system may coordinate information from a plurality of wireless interface devices. In particular, indicators may be received relating to the activation state of the plurality of wireless antenna systems on the information handling system. In an example embodiment, any of a plurality of simultaneous transmit configuration modes may be selected. The following table illustrates a plurality of simultaneous transmit configuration modes.

TABLE 1

| Active Link Types | Simultaneous transmit configuration modes |
|---|---|
| LTE | LTE Band 2/4/5/12/13/25/26/30/41 |
| LTE + BT | LTE Band 2/4/5/12/13/25/26/30/41 + BT |
| LTE + WiFi | LTE Band 2/4/5/12/13/25/26/30/41 + 2.4 GHz WiFi |
| | LTE Band 2/4/5/12/13/25/26/30/41 + 5.0 GHz WiFi |
| | LTE Band 2/4/5/12/13/25/26/30/41 + 2.4 GHz WiFi + 5.0 GHz WiFi |
| LTE + WiFi + BT | LTE Band 2/4/5/12/13/25/26/30/41 + 2.4 GHz WiFi + BT |
| | LTE Band 2/4/5/12/13/25/26/30/41 + 5.0 GHz WiFi + BT |
| | LTE Band 2/4/5/12/13/25/26/30/41 + 2.4 GHz WiFi + 5.0 GHz WiFi + BT |
| WiFi + BT | 2.4 GHz WiFi+ BT |
| | 5.0 GHz WiFi+ BT |
| | 2.4 GHz WiFi + 5.0 GHz WiFi + BT |
| WiFi | 2.4 GHz WiFi |
| | 5.0 GHz WiFi |
| | 2.4 GHz WiFi + 5.0 GHz WiFi |
| BT | BT |

As shown above in Table 1, a plurality wireless link system types may be active. Combinations of wireless link types may be reported as active to the co-located antenna dynamic power control system. Within each combination of wireless link type, several options of simultaneous transmit configuration modes are possible. As shown above, LTE may operate in several radiofrequency bands and, thus, may yield substantially more simultaneous transmit configuration modes than shown above. For brevity, the possible combinations of LTE bands operational with co-located antennas are shown with slashes between the various bands. Any combination of some or all of these LTE bands may be utilized and each combination may yield its own simultaneous transmit configuration mode as can be appreciated.

Further, several options for WiFi operation may be permitted including 2.4 GHz, 5 GHz and any other frequency bands contemplated for WiFi operation. In another aspect, WiFi may operate on a plurality of radio transmitters to operate in MIMO versus single transmitter operation or single chain operation. The plurality of MIMO operating radio transmitters may both be in 2.4 GHz, 5 GHz, a combination, or another contemplated frequency band. This multiple transmitters versus single transmitter operation provides for additional antenna systems that may be operation for each band of WiFi. Thus, several additional options for WiFi may yield more simultaneous transmit configuration modes than shown above. Again for brevity, this level of detail has been omitted from Table 1. Moreover it is understood that the co-located antenna dynamic power control system may dynamically control many other types of antenna systems on an information handling system. It can be appreciated that more simultaneous transmit configuration mode combinations may be added with WiGig capability, utilization of WPAN technologies, or various others. In addition, it is contemplated that WCDMA may be used in place of LTE or in addition to LTE to add yet more simultaneous transmit configuration mode possibilities or different possibilities to the above Table 1.

The co-located antenna dynamic power control system may be operational at a wireless interface device or may operate at an operating system level. Further, the co-located antenna dynamic power control system may operate as a software application or as part of a BIOS system in whole or in parts. Data to determine active wireless links for determining the simultaneous transmit configuration modes may be gathered by the co-located antenna dynamic power control system from multiple drivers or wireless interface devices. Flow may proceed to 615 to further determine relative data transmission level activity of each of the wireless links. Determination of levels of activity may be assessed by the co-located antenna dynamic power control system from data reported by various parts of the information handling system. For example, levels of transmission or reception of data wirelessly may be assessed from data reported from wireless antenna system drivers/modules, antenna system controllers, other aspects of the wireless interface devices, or from OS activity of software and other applications connecting with or seeking transmission or reception of data with one or more antenna systems. Queues and pre-loaders may be integral to assessing levels or types of data (streaming, bursty, background, etc.) that are set for transmission in one embodiment. In other embodiments, determination of transmission levels versus reception levels, during which transmission power is limited, may be assessed from similar sources.

The co-located antenna dynamic power control system will compare relative transmission levels for each of the active wireless links or may designate threshold definitions for data transmission levels. This may include threshold determinations for transmission levels, ratios of reception activity versus transmission activity, priority level assessments of data transmissions based on type and applications seeking transmission, and similar considerations.

Data priority level assessments may be related to whether the data type to be transmitted is of a type that may tolerate delays or limitations. For example, streaming data such as streaming broadcasts of communications from an information handling system, or web responses by users would have high priority and low tolerance for delays or errors in some aspects. Transmission of data back-ups in other examples may however have a lower priority and a higher tolerance of delays. Thus, a high level of data transmission over an antenna system may in some embodiments garner a dynamic adjustment of power in favor of that antenna system. In other embodiments, the determination of dynamic power control and power allotment to a high volume transmitter may be tempered by the priority level of the high volume of data compared to other data to be transmitted. High priority data may supersede the dynamic power allotment to a high volume transmitter. It is understood, allowing an antenna system to operate at higher power is advantageous to transmission quality, reduced errors and delays, and other improvements in wireless link communication. However, this is limited by FCC and other regulating body SAR limitations as well as power consumption considerations. The antenna traffic levels are utilized by the co-located antenna dynamic power control system to determine dynamic power control apportionment among active wireless links. Higher transmitting levels, higher data priority levels, or some combination may be utilized by the co-located antenna dynamic power control system to dynamically control power for transmitters in the information handling system.

In an embodiment, flow proceeds to 620 where the co-located antenna dynamic power control system may access a matrix of predefined power cutback tables. The predefined power cutback tables may determine a power reduction only for wireless transmissions by some antenna systems that have lower expected volumes of transmission, lower priority transmissions, or some combination of the same. In further embodiments, the predefined power cutback tables may indicate a reduction in power levels permitted by lower volume or lower data priority transmitters as well as a corresponding increase in power levels allowed by higher volume/priority transmitters. Any corresponding increase of transmission power levels may be up to a level permitted for this higher volume/priority transmitter as if it were operating without other active transmitters in some embodiments. The matrix of power cutback tables accessed by the co-located antenna dynamic power control system may be particular to simultaneous transmit configuration modes determined above. It is appreciated that several types of power cutback tables may be used. The following are example embodiments of power cutback tables used with a co-located antenna dynamic power control system.

In the following example embodiments, co-located antenna dynamic power control system may dynamically alter the concurrent power levels of the plurality of antenna systems or even shared antenna systems based on a predefined power cutback table or tables. Antenna power adjustments for one or more co-located antenna systems in response to determination of a simultaneous transmit configuration modes and traffic levels for transmission or reception activity are shown below. An example predefined power cutback table is shown below in Table 2 for a WiFi standalone simultaneous transmit configuration mode with LTE turned off or otherwise not operating or active.

TABLE 2

| | Predefined power cutback table (WiFi Standalone) | | | | | |
|---|---|---|---|---|---|---|
| Co-located usage mode | WiFi 2.4 GHz | WiFi 5 GHz | LTE Band A | LTE Band B | LTE Band C | LTE Band XX |
| Simultaneous transmit traffic on WiFi 2.4 and 5 GHz | 0 dB | 0 dB | — | — | — | — |
| Upload traffic on WiFi 5 GHz. Sporadic traffic on WiFi 2.4 GHz | 2 dB | 0 dB | — | — | — | — |
| Upload traffic on WiFi 5 GHz. Background traffic on WiFi 2.4 GHz | 4 dB | 0 dB | — | — | — | — |
| Upload traffic on WiFi 2.4 GHz. Sporadic traffic on WiFi 5 GHz | 0 dB | 2 dB | — | — | — | — |
| Upload traffic on WiFi 2.4 GHz. Background traffic on WiFi 5 GHz | 0 dB | 4 dB | — | — | — | — |

Another example predefined power cutback table is shown below in Table 3 for an LTE standalone simultaneous transmit configuration mode with WiFi not active. A cutback table with additional bands or transmitters in either WiFi or LTE is also contemplated, for example the designation LTE Band XX may indicate additional LTE Bands are contemplated.

TABLE 3

Predefined power cutback table (Cellular Standalone)

| Co-located usage mode | WiFi 2.4 GHz | WiFi 5 GHz | LTE Band A | LTE Band B | LTE Band C | LTE Band XX |
|---|---|---|---|---|---|---|
| Heavy transmit upload traffic | — | — | 0 dB | 0 dB | 0 dB | 0 dB |
| Moderate transmit upload traffic | — | — | 2 dB | 2 dB | 2 dB | 2 dB |
| Sporadic upload traffic | — | — | 4 dB | 4 dB | 4 dB | 4 dB |
| Light upload traffic | — | — | 6 dB | 6 dB | 6 dB | 6 dB |
| Background traffic | — | — | 8 dB | 8 dB | 8 dB | 8 dB |

Yet another example predefined power cutback table is shown below in Table 4 for a combined WiFi and LTE operational simultaneous transmit configuration mode.

TABLE 4

Predefined power cutback table (Cellular + WiFi)

| Co-located usage mode | WiFi 2.4 GHz | WiFi 5 GHz | LTE Band A | LTE Band B | LTE Band C | LTE Band XX |
|---|---|---|---|---|---|---|
| WiFi upload traffic; LTE standby | 0 dB | 0 dB | 8 dB | 8 dB | 8 dB | 8 dB |
| Moderate transmit upload traffic | 2 dB | 2 dB | 6 dB | 6 dB | 6 dB | 6 dB |
| Sporadic upload traffic | 4 dB | 4 dB | 4 dB | 4 dB | 4 dB | 4 dB |
| Light upload traffic | 6 dB | 6 dB | 2 dB | 2 dB | 2 dB | 2 dB |
| Background traffic | 8 dB | 8 dB | 0 dB | 0 dB | 0 dB | 0 dB |

While Table 2, Table 3, and Table 4 are illustrative of co-located SAR cutback tables for power cutback among plural antenna systems operating on an information handling system, these tables are understood to be an example set of data for discussion purposes that may have additional aspects or may be different for various models of information handling systems. Many variations of simultaneous transmit configuration modes are contemplated. Further, many variations on the levels of co-located usage modes may also be defined based on measured data transmission activity levels or a ratio between transmissions and reception in various embodiments. In other embodiments, the co-located usage modes may also incorporate data type priority considerations associated with permissible power cutback levels (not shown).

Thus, it is understood that Table 2, Table 3, and Table 4 above show only an example set of co-located antenna SAR cutback adjustment policy for an information handling system. The example tables may further be only part of a wider matrix of tables or data of the overall antenna power adjustment policy for a plurality of simultaneous transmit configuration modes on the information handling system. Further details of the operation of the co-located antenna dynamic power control system implementing dynamic power cutback policy for a plurality of RF antenna systems operating on an information handling system are described in embodiments herein.

The predefined power cutback table may be different when utilized within different models of information handling systems or depending on administrative settings but may generally ensure that the co-located SAR levels operating with a plurality of antennas remains below a regulatory safety level. For example, the power cutback table may be particular for various models of information handling system and tailored to the types of antenna locations and utilization on those devices as well as orientation changes that are possible and SAR safety requirements for those particular devices. Moreover, some or all of the available antenna systems above may be inactive and this may change the cutback table for some or more of the antenna system types. For example, one or more LTE antennas may not be actively operating or may not operate under a MIMO operation, but instead may have independent LTE wireless links from which distinct wireless data streams are connected. Upon being installed into and configured for a model of an information handling system, a custom set of cutback tables may be used with the co-located SAR dynamic adjustment system to maintain transmission power levels within the regulatory limits but provide for dynamic adjustment depending on dynamic activity among the antenna systems.

At 625, the co-located antenna dynamic power control system shall determine if any active wireless link on an antenna system will operate with sporadic traffic levels, background traffic levels, or operate in a largely reception download state as compared to a full transmission upload operation. If all active wireless links are in full transmission upload, then flow proceeds to 635 where the co-located antenna dynamic power control system will continue to monitor any changes in transmission levels. Additionally, the co-located antenna dynamic power control system will monitor for added or subtracted active wireless links. In this way, the co-located antenna dynamic power control system may maintain dynamic power control over the co-located antenna systems.

In another example embodiment, the co-located antenna dynamic power control system at 625 will assess active wireless links for disparity of data priority levels. If the data priority levels and expected transmission volumes are not different, then in this embodiment flow may proceed to 635 for ongoing monitoring of the status of the active wireless links and for changes in activity. At 635, the co-located antenna dynamic power control system may also monitor for changes in transmission data types at antenna systems which may reset data priority levels.

If at 625, any active wireless link will operate with sporadic traffic levels, background traffic levels, or operate in a largely reception download state, then flow may proceed to 630 in one embodiment. In other embodiments, the priority level of data transmission levels may be assessed at 625. If the assessment of priority is distinct between at least one active antenna system and the other wireless links, then flow may proceed to 630. Additional criteria may be used in determining power level apportionment among active wireless links by the co-located antenna dynamic power control system in other embodiments.

At 630, the co-located antenna dynamic power control system will reduce power levels to active wireless links based on lower data transmission levels relative to other active antenna systems. In another embodiment, power reduction may occur based on relative data priority rankings for data to be transmitted on the plurality of active antenna systems. In either embodiment, the reduction levels may be based on the cutback tables accessed for the simultaneous transmit configuration mode detected as described herein. The co-located antenna dynamic power control system may then create an instruction to antenna system power controllers to reduce transmission power levels by the predetermined amount for one or more antenna systems.

In another embodiment, the co-located antenna dynamic power control system may determine a cutback level and calculate or access a pre-determined allowable increase in other co-located active antenna systems. The corresponding transmission power level increase is limited to within the maximum allowable SAR levels as predetermined by system testing. With the calculated or pre-determined allowable increase for one or more other antenna systems, the co-located antenna dynamic power control system will determine an instruction to increase the allowable power transmission levels of another or a plurality of other active antenna systems. This instruction may be delivered to one or more power controllers associated with the affected antenna systems.

After implementation of the active power adjustment, flow may proceed to 635 where the co-located antenna dynamic power control system will continue to monitor any changes in transmission levels. In other aspects, the co-located antenna dynamic power control system may also monitor for added or subtracted active wireless links as described before. If a change is detected, the flow may return to 605 for a re-assessment of which wireless links are active in the information handling system and the co-located antenna dynamic power control may proceed as before with dynamic power control of the plurality of active wireless links and the corresponding antenna systems.

Figure 7:
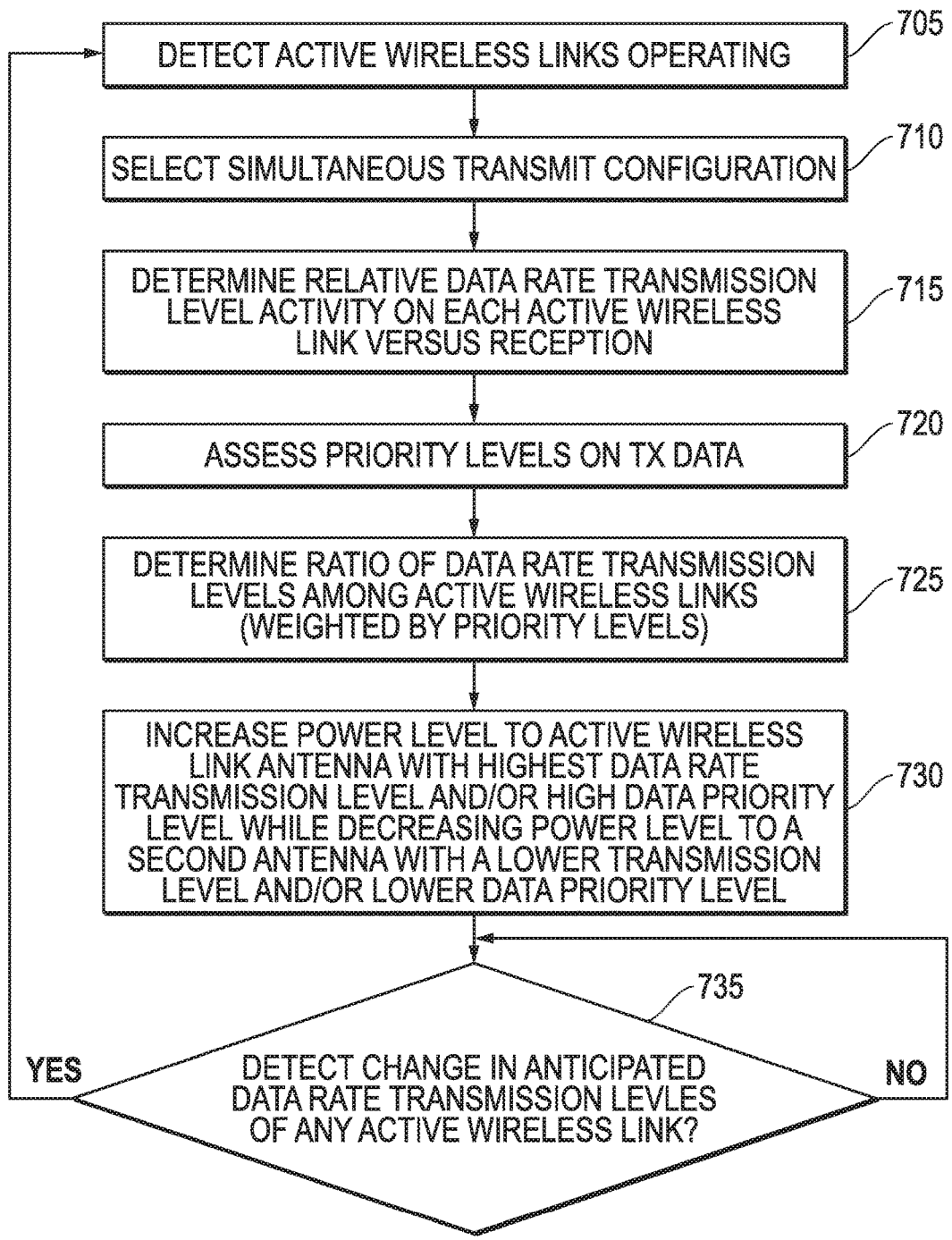
FIG. 7 is a flow diagram illustrating a method of dynamic control of a plurality of co-located and operating antenna systems to maintain regulatory SAR levels for an information handling system according to another embodiment of the present disclosure.

FIG. 7 shows another method for operating a co-located antenna dynamic power control system for determining power control adjustments for antenna systems according to an embodiment.

At 705, the information handling system operates a co-located antenna dynamic power control system to determine active wireless links from a plurality of wireless antenna systems available on an information handling system. The co-located antenna dynamic power control system may receive indications of active status from any of several aspects of an information handling system including drivers, controllers in a wireless interface device, software or hardware control settings for antenna systems, or OS operation including operating software applications and firmware seeking to send or receive data wirelessly. The co-located antenna dynamic power control system may be initialized upon start up to actively monitor the ongoing status of active wireless links or to monitor data rate transmission/reception levels or changes in types of antenna system usage based on the types of data to be transmitted or received by operating software or hardware applications. Active antenna system status may include determination of antenna systems that have not been turned off, antenna systems that are not dormant due to available wireless connectivity, or antenna systems that have not been placed into a sleep mode or other inactive state for other various reasons understood to impact usage of wireless links.

Upon determining which wireless links are active and which wireless antenna systems will be active, flow proceeds to 710. At 710, the co-located antenna dynamic power control system establishes which combination of antenna systems may be operating simultaneously to either transmit or receive data. In one example embodiment, the combination of active antennas establishes which of a set of simultaneous transmit configuration modes is operational. In one aspect, the co-located antenna dynamic power control system may then determine which of a matrix of cutback tables may apply to dynamic power reduction measures. In another aspect, the simultaneous transmit configuration mode identified may invoke a set of calculations for power reduction levels relative to an information handling system type due to locations of antenna systems and SAR measurement characteristics of the information handling system in an embodiment.

Proceeding to 715, the co-located antenna dynamic power control system determines relative data transmission rates or activity of each active antenna system of the simultaneous transmit configuration mode. Transmission rates or activity may be assessed from an OS and BIOS operating to establish wireless links for connectivity to data transmissions and data reception. As described, application software may indicate the level of transmission or reception activity based on the type of application operating. For example, a video player or music player may indicate largely downloaded reception activity. Database back-up software may indicate largely transmission upload data activity. Web browser operation or online gaming software may indicate various levels of transmission and reception. Similarly, communication software such as videoconferencing software, VoIP, internet messaging, email, texting or the like may similarly invoke various levels of transmission and reception depending on activity state.

In other aspects, data queues or pre-loaders for data transmissions may be assessed for activity to determine data transmission levels. In yet other aspects, ongoing transmission activity levels reported from wireless interface devices or RF front end systems associated with antenna system types may report on upload transmission activity and reception activity. Any of these inputs may be used to determine relative data rate transmission levels among active wireless links.

At 720, the co-located antenna dynamic power control system may determine priority levels of types of data set for transmission on the various active antenna systems in the simultaneous transmit configuration determined. The priority levels may be assigned due to impact on user experience for example. Streaming communication software such as videoconferencing software, VoIP or the like may not tolerate a reduction in signal quality at lower power levels and may be reserved to maintain higher transmission power levels by the co-located antenna dynamic power control system. Similarly web browser or web gaming applications may not tolerate interruptions or degradation, and thus may be assigned a higher priority for transmission. Other communication software systems such as internet messaging, email, texting or the like may be bursty and some allowance made for finding opportune transmission windows or repeat transmissions to a degree. One or more of these may be allowed a lower data priority level for transmission and tolerate lower transmission power levels. Backup data uploads by the same token may be low priority data in an example. Similarly, background data upload responses such as for pinging responses or ongoing communication links during downloads may similarly have low data priority levels. Also, wireless links may be in a scanning mode seeking connectivity where transmission may also be low priority relative to other actively transmitting wireless links.

Proceeding to 730, the co-located antenna dynamic power control system determines a ratio of allocated power levels to be assigned among active antenna systems in view of the ratio of current and anticipated data rate transmission levels detected at 715. In an example embodiment, a direct ratio of detected data rate transmission levels among active wireless links may determine a share of the cumulative allowed transmission power levels under SAR limits. In another embodiment, a weighting factor may be applied to ensure that one or more wireless links are not reduced in power so much so that transmission is ineffective. Thus, the share of power allocated among active wireless links is made with a weighted proportionality or there is a maximum reduction permitted for any one active wireless link. Maximum allowed power level of any one active wireless link may be subject to a threshold or capped setting level as well. In one example, that threshold maximum may be the maximum for that wireless link operating alone. Other maximum threshold levels may be used.

In another embodiment at 725, the co-located antenna dynamic power control system may assess the data priority levels of the types of data to be transmitted on each of the active wireless links. The data priority levels may be ranked and a highest ranking, such as with ongoing streaming communication uploads, may be immune to power reduction at corresponding active wireless links. Data transmitters responsible for transmitting highest priority data may instead be subject to available increases in power. In other embodiments, the data priority level ranking may be used as a weighting factor in the determination by the co-located antenna dynamic power control system of apportionment of power levels. Again, maximum or minimum threshold levels of power may be used to ensure no active wireless link is reduced by too substantial an amount to be rendered ineffective.

In yet another embodiment, a cutback table may be used as shown above but modified to include predetermined reduction levels or increase levels based on both data rate transmission levels and data priority levels. The selection of the cutback table may be made according to a simultaneous transmit configuration determined as well as a matrix of the types of data to be transmitted on each of the active wireless links. It is understood, that the cutback tables may be of a variety of types used to assist the co-located antenna dynamic power control system in dynamically altering the power levels of active wireless links as needed.

At 730, the co-located antenna dynamic power control system may provide one or more instructions to wireless interface devices and RF front end systems for the active wireless antenna systems. In one example embodiment, as between two active antenna systems, the co-located antenna dynamic power control system may send an instruction to increase the power level to the antenna system having the higher data transmission rate and/or higher assessed data priority level in a level commensurate with an instruction to decrease a second antenna system power level that has a lower transmission level and/or a lower data priority level. It can be appreciated, that a plurality of antenna systems may be dynamically controlled for power levels depending on the simultaneous transmit configuration mode applicable and the relationship or ratio of transmission levels or data priority levels that apply. Determination of power level adjustments among the plurality of active wireless antenna systems may then be made by the co-located antenna dynamic power control system in accordance with embodiments herein.

Flow may proceed to 735 where the co-located antenna dynamic power control system will monitor for changes in anticipated data rate transmission levels or data priority levels on any active wireless link. If no changes are detected, flow returns to 735 to indicate that ongoing monitoring will be conducted by the co-located antenna dynamic power control system. However, if a change is detected to the data rate transmission levels (or the data priority levels) of any active wireless link of the information handling system, then flow will return to 705 where the co-located antenna dynamic power control system may operate in accordance with the above embodiments.

It is understood that the methods and concepts described in the algorithm above for FIG. 6 and FIG. 7 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 6 and 7 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a wireless interface adapter for communicating on a plurality antenna systems for connection to a plurality of concurrently operating wireless links;
a processor executing code instructions for a co-located antenna dynamic power control system for detecting a first active wireless link operating via a first antenna system and a second active wireless link operating via a second, co-located antenna system, wherein the total transmission power between the first antenna system and the second antenna system is limited to a regulatory safety maximum;
the processor determining relative transmission activity levels for the information handling system relative to the first active wireless link and the second active wireless link, including a first wireless link data rate transmission level for the first antenna system and a second wireless link data rate transmission level for the second antenna system;
the co-located antenna dynamic power control system instructing the wireless interface adapter controller to increase transmission power to the first antenna and decrease transmission power to the second antenna relative to the regulatory safety maximum power level when the first wireless link data rate transmission level is greater than the second wireless link data rate transmission level and the first wireless link data rate transmission level for the first antenna system includes a transmission data rate above a threshold level.

2. The information handling system of claim 1, wherein the first active wireless link is a WLAN link with active IP networking activity and wherein the second active wireless link is a WWAN link with active IP networking activity.

3. The information handling system of claim 1, further comprising:
the processor accessing a cutback table of permitted power levels in co-location operation modes between the first active wireless link and the second active wireless link to determine permitted power levels at each of the first antenna system and the second, co-located antenna system.

4. The information handling system of claim 1, wherein a second wireless link data rate transmission level for the second antenna system includes a combination of transmission and reception activity.

5. The information handling system of claim 1, further comprising:
the co-located antenna dynamic power control system instructing the wireless interface adapter controller to decrease transmission power to the first antenna and increase transmission power to the second antenna relative to the regulatory safety maximum power level when the first wireless link data rate transmission level is less than the second wireless link data rate transmission level.

6. The information handling system of claim 1, further comprising:
processor detecting a third active wireless link operating via a third antenna system, wherein the total transmission power between the first antenna system, the second antenna system, and the third antenna system is limited to a regulatory safety maximum;
the processor determining a third wireless link data rate transmission level for the third antenna system; and
the co-located antenna dynamic power control system instructing the wireless interface adapter controller to alter transmission power to the first antenna, the second antenna, and the third antenna based on relative wireless link data rate transmission levels.

7. The information handling system of claim 1, further comprising:
the processor accessing a data transmission queue and pre-loader for determining anticipated wireless link data rate transmission level of the plurality of antenna systems.

8. A computer implemented method comprising:
executing code instructions, via a processor, for a co-located antenna dynamic power control system to detect a first active wireless link operating via a first antenna system and a second active wireless link operating via a second, co-located antenna system, wherein the total transmission power between the first antenna system and the second antenna system is limited to a regulatory safety maximum;
determining a plurality of wireless link data rate transmission levels for transmission via each of the first active wireless link and the second active wireless link including determining periods of reception by the first active wireless link and the second active wireless link; and
dynamically adjusting the transmission power between the first antenna system and the second antenna system relative to the regulatory safety maximum power level based on a ratio between the wireless link data rate transmission levels for transmission via each of the first active wireless link and the second active wireless link.

9. The method of claim 8, further comprising:
monitoring the plurality of wireless link data rate transmission levels for transmission via each of the first active wireless link, the second active wireless link, and one or more additional active wireless links corresponding changes in the ratio between wireless link data rate transmission levels for the first active wireless link, the second active wireless link, and the one or more additional active wireless links.

10. The method of claim 9, further comprising:
dynamically adjusting the transmission power between the first antenna system, the second active wireless link, and one or more additional active wireless links relative to the overall regulatory safety maximum power level based a ratio between the wireless link data rate transmission levels for transmission via each of the first active wireless link, the second active wireless link, and one or more additional active wireless links.

11. The method of claim 8, further comprising:
accessing a cutback table of permitted power levels in co-location operation modes between the first active wireless link and the second active wireless link to determine permitted power levels at each of the first antenna system and the second, co-located antenna system.

12. The method of claim 8, further comprising:
accessing a data transmission queue for the active wireless links determining the plurality of wireless link data rate transmission levels.

13. The method of claim 8, further comprising:
accessing a pre-loader for the active wireless links determining the plurality of anticipated wireless link data rate transmission levels.

14. The method of claim 8, wherein each of the first active wireless link and the second active wireless link include a combination of transmission and reception activity.

15. An information handling system comprising:
a plurality antenna systems for connection to a plurality of concurrently operating wireless links;
a processor executing code instructions for a co-located antenna dynamic power control system to detect a plurality of active wireless links operating via a plurality of antenna systems co-located on the information handling system, wherein the total transmission power of the plurality of antenna systems is limited to a regulatory safety maximum;
the processor determining a simultaneous transmit configuration mode for the plurality of active wireless links and accessing a cutback table of permitted power levels for the simultaneous transmit configuration mode;
the processor determining a wireless link data rate transmission level for each of the plurality of active wireless links including determining an anticipated ratio of transmission versus reception activity for each of the plurality of wireless links and accessing the cutback table of permitted power levels; and
the wireless interface adapter dynamically adjusting the transmission power between the plurality of antenna systems co-located on the information handling system relative to the regulatory safety maximum power level based on the cutback table of permitted power levels.

16. The information handling system of claim 15 wherein the cutback table of permitted power levels is adjusted according to a ratio among each of the plurality of wireless link data rate transmission levels anticipated.

17. The information handling system of claim 15 wherein the processor accesses a data transmission queue for each of the plurality of active wireless links to estimate the plurality of wireless link data rate transmission levels.

18. The information handling system of claim 15, wherein a first active wireless link is a WLAN link, a second active wireless link is a WWAN link, and a third active wireless link is a WiGig link.

19. The information handling system of claim 15, wherein at least one of the active wireless links includes a combination of transmission and reception activity.

20. The information handling system of claim 15, further comprising:
the processor monitoring for changes in wireless link data rate transmission levels or active wireless links and accessing a cutback table of permitted power levels for the corresponding simultaneous transmit configuration mode in response.

\* \* \* \* \*